United States Patent [19]

Michelsen

[11] 4,039,373

[45] Aug. 2, 1977

[54] STATIC DISCHARGE DEVICE AND METHOD FOR FIBER DISCHARGE FROM A PRESSURIZED DIGESTER

[75] Inventor: Johan L. Michelsen, Minnetonka, Minn.

[73] Assignee: American Defibrator, Inc., Minneapolis, Minn.

[21] Appl. No.: 645,673

[22] Filed: Dec. 31, 1975

[51] Int. Cl.² .............................................. D21C 7/08
[52] U.S. Cl. ...................................... 162/52; 162/246
[58] Field of Search .................. 162/17, 52, 236, 237, 162/246; 209/250, 268

[56] References Cited

U.S. PATENT DOCUMENTS

| 2,425,024 | 8/1947 | Beveridge et al. | 162/236 |
|---|---|---|---|
| 2,616,802 | 11/1952 | Kehoe et al. | 162/236 |
| 2,882,967 | 4/1959 | Surino | 162/246 |
| 2,963,086 | 12/1960 | Green | 162/237 |
| 3,446,701 | 5/1969 | Lloyd | 162/237 |
| 3,519,532 | 7/1970 | Sutherland | 162/246 |
| 3,617,433 | 11/1971 | Sutherland | 162/52 |

Primary Examiner—S. Leon Bashore
Assistant Examiner—Peter F. Kratz
Attorney, Agent, or Firm—Eric Y. Munson

[57] ABSTRACT

A static discharger includes a vertical casing connected to a pressurized pulping digester for receiving a stream of fibrous material and having a valve isolated scrap collector positioned on its lower end. A discharge neck on which a blow valve is mounted extends from the casing above the scrap collector and is covered with a grid plate having self-cleaning openings. A pipe mounted tangentially on the casing introduces flooding liquid thereto while a similar pipe may be located on the scrap collector. A sealed casing cleanout opening may be provided. No moving parts are involved since discharger agitations result from the flooding media. Heavy foreign body impurities in the stream sink to the scrap collector where they are removed without process interruption. Buoyant objects remain suspended in the liquid. Blow valve plugging is eliminated. For higher fiber consistency, a grid plate wiping agitator may be advantageously installed in the casing.

12 Claims, 6 Drawing Figures

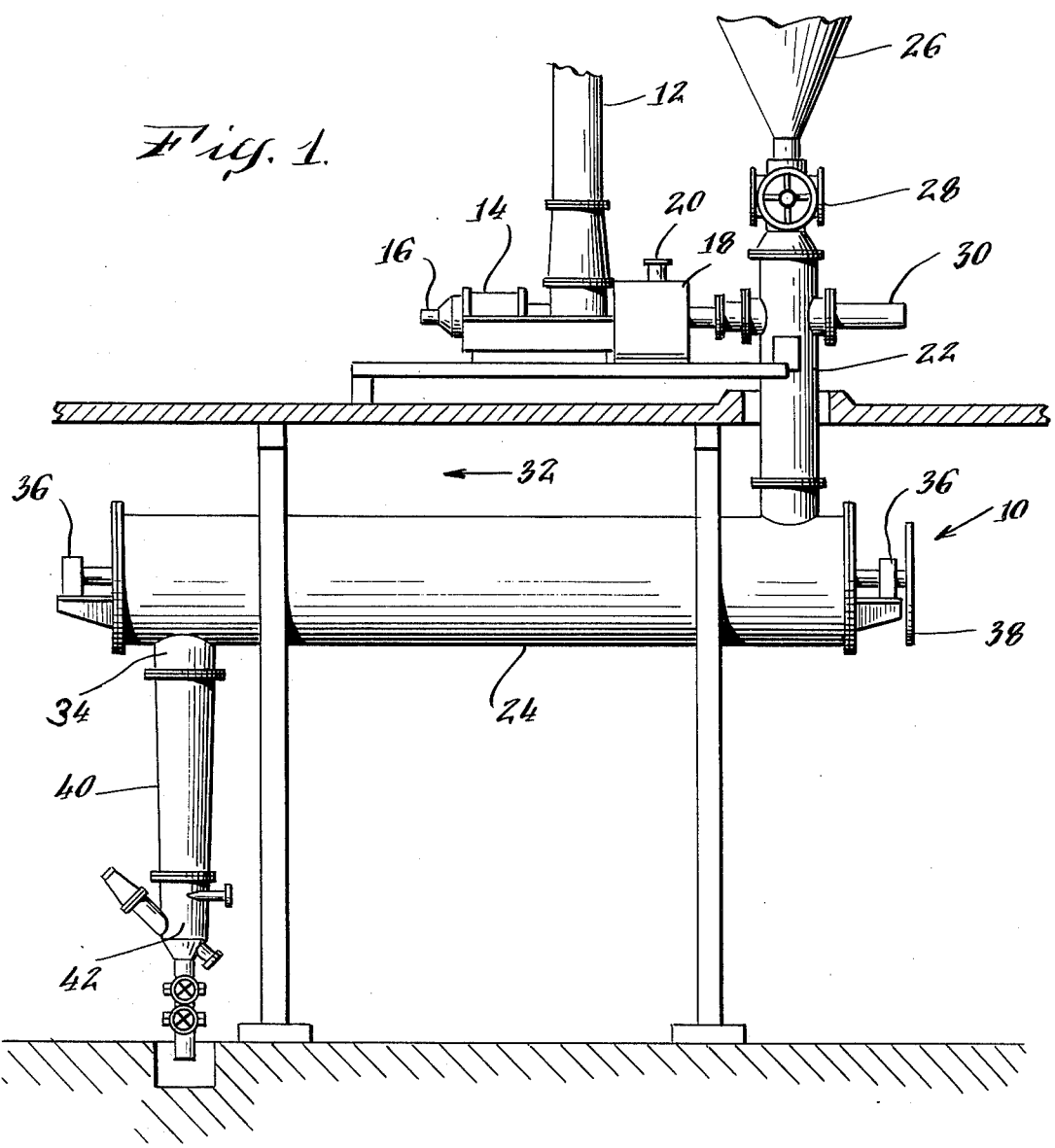
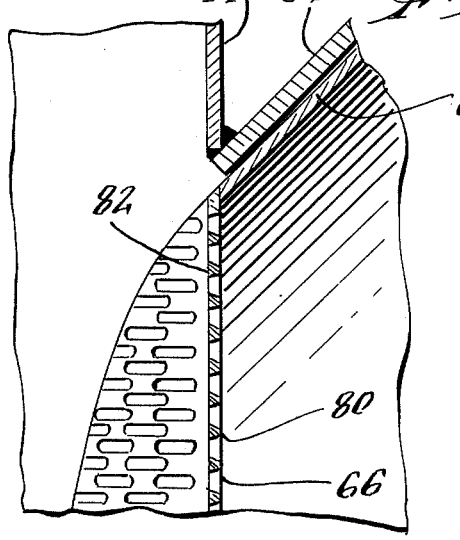
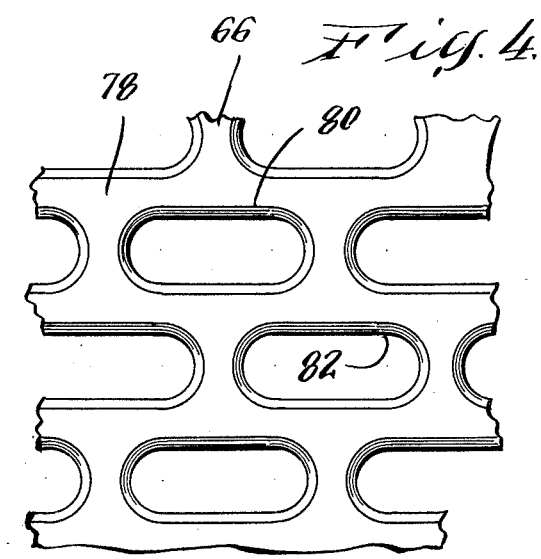

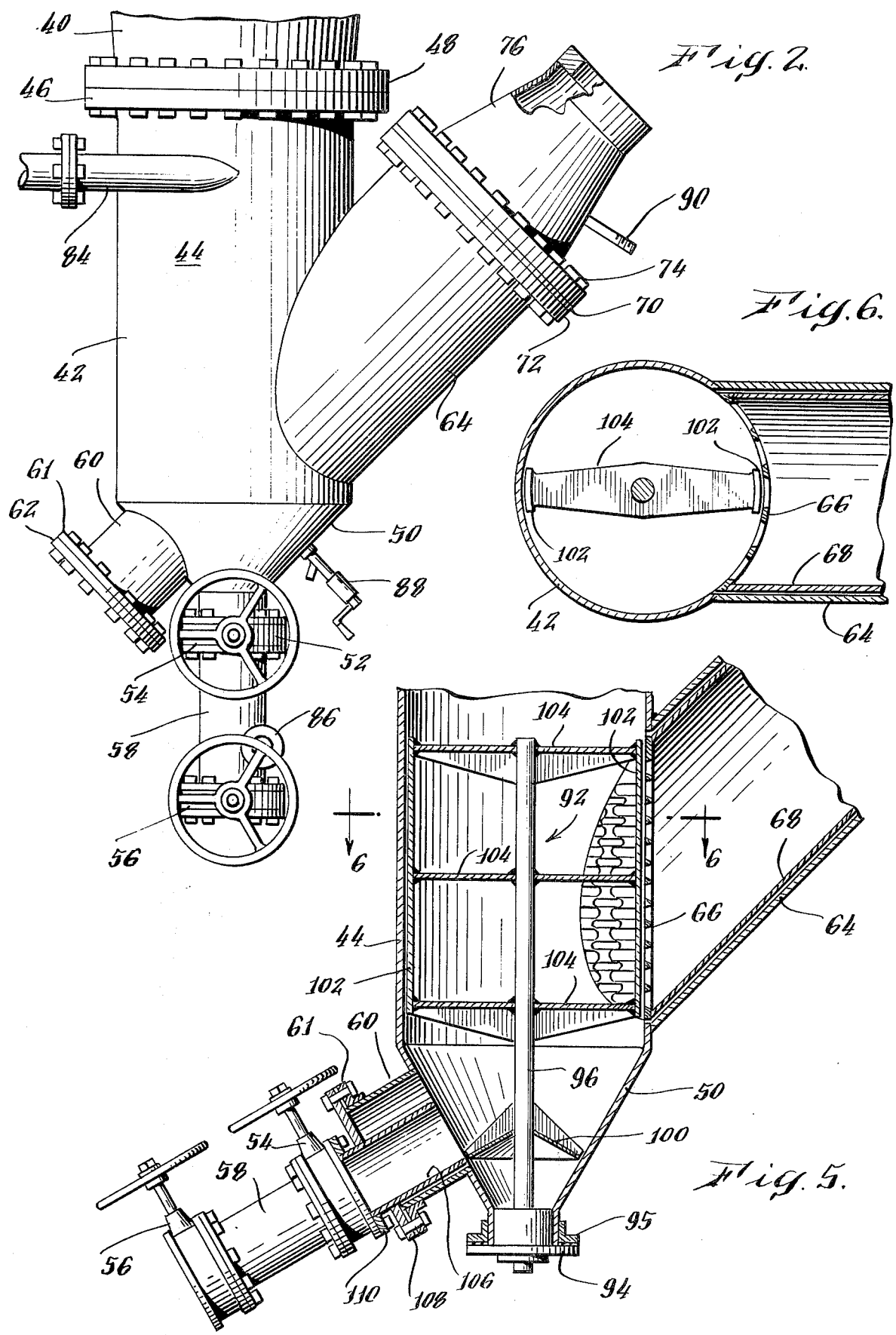

STATIC DISCHARGE DEVICE AND METHOD FOR FIBER DISCHARGE FROM A PRESSURIZED DIGESTER

BACKGROUND OF THE INVENTION

The present invention relates to a discharger for discharging fibrous material from a pressure system and, more particularly, to a static discharge device and method for discharging bagasse or other nonwood plant fibers from a continuous pressurized chemical pulp digester unit employing a "cold blow" or flooded discharge method of fiber discharge.

In a typical continuous digester utilized in a chemical or semi-chemical pulping process, fibrous cellulose material, such as wood chips, bagasse, bamboo, sawmill wastes and the like, are digested under steam pressure with a cooking liquor. Since the pulping apparatus is operated continuously, it is essential to provide a discharge device for withdrawing fiber stock which will not deleteriously affect the efficient operation of the apparatus by requiring the application of excessive amounts of blowing steam or by allowing a pressure drop within the system. Discharge devices have included conveyor screw-containing pressurized vessels and outlet ducts utilizing alternately actuated reciprocating blow valves operating on a sluicing principle to discharge fiber stock without concomitant waste of steam and drop of pressure within the system. Other discharge devices utilize mechanically operated impellers or paddles for breaking up larger fiber bundles and wiping the blow valve orifice in discharging from digester units employing the black liquor flooded discharge or "cold blow" method wherein steam pressure in the digester provides the necessary propellant force to blow the fibers to a blow tank through the orifice of the blow valve.

The known discharge devices possess disadvantages due to several reasons. For example, the presence of moving parts results in wear and necessitates frequent inspection, dismantling of the parts and replacement of worn components in order to maintain the efficiency of the apparatus. In addition, costly unscheduled downtime in installations having continuous digesters occurs due to plugging of the blow valves by stream impurities including scrap of almost any kind such as rocks, wood chunks, metal pieces from upstream equipment, tools, metal cans and other foreign bodies. While an efficient washing system may reduce this unwanted downtime, washing alone can never completely eliminate it.

SUMMARY OF THE INVENTION

The present invention overcomes the above-mentioned drawbacks associated with the known discharge devices by providing a static discharger, that is, a discharge device without any moving parts, which is designed to completly eliminate downtime due to plugged discharge components such as blow valves. The static discharge according to this invention utilizes the agitation resulting from the black liquor flooding media which is pumped into the discharger and hence there are no moving parts and no power input. Accordingly, the static discharge device is less expensive to manufacture as well as less expensive to operate due to the increased efficiency of the digester unit resulting from reduced costly downtime.

The foregoing advantages are achieved according to this invention by a static discharge device having a vertical cylindrical casing body which is connected to a digester tube outlet by means of an intermediate pipe of proportions suitable to cool the fibrous material stream while maintaining a liquid level in the discharger. The bottom or lower portion of the discharge device is a conical transition piece terminating in a flange to which is connected a scrap collector assembly of two gate valves between which is a cylindrical chamber. A large diameter, flanged discharge conduit neck extends at an angle from the body of the discharger, includes a grid plate having a series of closely spaced elongated self-cleaning holes and terminates in a flange for the mounting of a blow valve. A blind-flanged cleanout opening extends from the conical portion of the discharger while a flanged inlet conduit or pipe for the quenching liquor is located tangentially on the discharge body in the vicinity immediately above the grid plate.

The discharge from the static discharger is achieved in a manner similar to that for the other types of discharge devices while avoiding the drawbacks associated therewith. The steam pressure in the digester provides the necessary propellant force to blow the fibers to a blow tank through the orifice of the blow valve. Foreign objects heavy enough to sink in the liquid are collected in the scrap collector chamber and can be cleaned out of the system while in full operation. Wood and floating objects are harmlessly suspended in the "cold blow" liquid until a regular scheduled shutdown when they can be removed. Since the pulp is suspended in a relatively slow moving liquid there is no appreciable wear of parts. Also, by regulating the amount of liquor entering the scrap chamber, an upflow can be created to prevent settling of the pulp in this area.

Accordingly, a feature of this invention is the provision of a static discharge device having no moving parts and substantially reducing downtime resulting from plugged discharge valves.

A further feature of this invention is the provision of a method of discharging fibers from a digesting unit without the need for complex mechanical equipment while maintaining the efficiency of the unit near its maximum by reducing unwanted downtime due to discharge apparatus plugging.

Where it is desirable to discharge fibers from a system in which the fiber consistency in the discharger is to exceed about 8 percent, the discharger, according to another aspect of this invention, may be provided with mechanical agitation. Thus, an agitator providing the necessary agitation while, at the same time, wiping the grid plate is installed in the discharger. The agitator may be provided with a slightly conical plate which is capable of catching and injecting, into the scrap collector chamber, any objects falling or sinking down through the pulp. These objects would be removed as previously described without interruption in the digester operation.

Thus, it is yet another feature of this invention to provide an improved discharger having mechanical agitation means for enabling effective discharge of liquor and pulp having a consistency in excess of 8 percent.

The foregoing, as well as additional features and advantages of the invention, will be more readily apparent from the following description taken in connection with the accompanying drawings in which:

BRIEF DESCRIPTION OF THE DRAWINGS

FIG. 1 is an elevational view of a continuous digester apparatus utilizing a static discharge device according to an embodiment of this invention;

FIG. 2 is an enlarged detail view of the static discharge device shown in FIG. 1;

FIG. 3 is a view, partly in section, of the opening generated by the intersection of the discharge neck and the discharger body shown covered by a grid plate.

FIG. 4 is an enlarged detail view of the grid plate seen in FIG. 3 showing the self-cleaning tapered elongated holes;

FIG. 5 is a detailed view, partly in section, of an improved discharge device havng a mechanical agitator and grid plate wiper according to another embodiment of this invention; and FIG. 6 is a view, in section, taken along the line 6—6 of FIG. 5 showing the mechanical agitation profile.

DESCRIPTION OF THE PREFERRED EMBODIMENTS

Referring to FIG. 1, there is shown a continuous digestion system, referred to generally at 10, of the type finding utility for the production of pulp from bagasse. The material to be treated, bagasse, is supplied from an inlet chute 12 to a screw feeder 14 containing a feeding screw element rotated by a sprocket or pulley 16 by a suitable driving means. A safety blow back enclosure 18 surrounds the screw feeder throat in which moisture may be removed from the bagasse by compressing the bagasse. The water which is thus squeezed out of the bagasse exits through a drain pipe, not shown, communicating with the screw feeder throat. A steam vent pipe 20 is provided for blow back. The feeder discharges the bagasse through a vertical outlet pipe 22 to the digester tube 24.

Alternatively to the above described feed of bagasse, material to be digested may be introduced to the inlet hopper 26 and discharged through a rotary feeder 28 to the vertical outlet pipe 22. White liquor for the digester tube 24 may be fed to the vertical outlet pipe 22 by means of the inlet pipe 30. The horizontal digester tube 24 receives the material to be chemically digested at one end, through the vertical pipe 22, and carries it by means of an internal feed screw in the direction shown by the arrow 32 to its discharge through the discharge outlet 34. The internal feed screw rides on externally located block bearings 36 and is driven by a sprocket or pully 38 by a chain or belt extending from a suitable motor drive. A steam header, not shown, associated with the digester tube provides steam for the digestion process.

It is to be understood that the foregoing description is general for the purpose of describing the embodiment of an environment in which the present invention is advantageously utilized and that varying types of feed and digestion tube systems may be successfully employed in conjunction with the present invention which resides primarily in the discharge device described below.

The static discharge device 42, FIGS. 1 and 2, is connected to the digester tube 24 through an intermediate pipe 40 which is sized to selected proportions dependent upon the known operating conditions and parameters involved to be of sufficient length to permit the fibers to cool while maintaining a liquid level in the discharger. The static discharger 42 comprises a vertical cylindrical casing or body 44 having a top flange 46 for connection to the flange 48 of the intermediate pipe 40. The bottom portion of the discharger body is a conical transition piece 50 terminating in a flange 52.

An assembly of two gate valves, 54 and 56, with a cylindrical chamber 58 in between is connected to the flange 52 and forms a scrap collector chamber. A cylindrical extension 60 having a flange 61 and covered with a blind flange 62 secured to the flange 61 extends downwardly from the conical portion of the discharger body to form a cleanout opening.

A large diameter tubular conduit discharge neck 64 extends upwardly at an angle from the discharger body 4. The opening generated by the intersection of the tubular discharge neck 64 and the cylindrical discharger body 44 is covered by a grid plate 66, seen best in FIG. 3. The grid plate 66 is mounted to a thin-walled pipe 68 which fits inside the discharge neck 64 and is welded to a thin flange 70 completing the grid assembly. This grid plate assembly is firmly held in place by the flange portion 70 being sandwiched between discharge neck flange 72 and the flange 74 of a reducer section 76 on the end of which is mounted a blow valve, not shown.

The grid plate 66 has a series of closely spaced elongated openings 78, FIG. 4, which are made self-cleaning by being tapered towards the discharge side so that the area 80 of an opening 78 at its discharge side is greater than the area 82 of the opening at its intake or upstream side, thus minimizing any tendency for the openings to become clogged. A flanged inlet pipe 84 is positioned tangentially on the discharger body 44 in the vicinity immediately above the grid plate 66 for the introduction of quenching flooding liquor thereto. A smaller liquor inlet pipe 86 is located in a similar manner on the scrap collector chamber 58. A nonclogging sampling valve 88 and fittings for a temperature probe 90 are located on the conical section 50 and the reducer section 76, respectively.

The static discharge device of this invention operates as follows. During normal operation, the top valve 54 above the scrap chamber 58 is fully open while the bottom valve 56 is closed. Black liquor flooding media is pumped into the discharger body 44 tangentially through the inlet pipe 84 providing slow agitation therein through tangential flow. The flow of liquor into the chamber 58 through the inlet pipe 86 is adjusted to create the necessary upflow in the scrap collector chamber.

The pulp or fibrous material stream moves through the digestion tube 24 and gravitates from the digestion tube to the quenching liquor in the intermediate pipe 40 where lumps and fiber bundles begin to break up naturally and through the assistance of agitation created by the liquor entering the discharge chamber through the inlet pipe 84. Heavy objects, such as pieces of metal, rocks, and gravel sink down and collect within the scrap collector chamber 58. Periodically, an operator empties the chamber 58 by isolating it from the casing by closing the top valve 54 and opening the bottom valve 56 in an operation done in a matter of minutes so that continuous digester operation is not interrupted.

Buoyant objects, such as wood, which are of a sufficient size that they will not pass the grid plate 66 remain suspended and move about in the liquid until they are removed during a scheduled shutdown of the digester unit. The grid plate openings 78 are sized so that objects sufficiently small to pass through the openings also pass through the blow valve without causing clogging problems. Thus, moving parts are successfully eliminated.

Moreover shutdowns due to plugged openings are eliminated since foreign objects heavy enough to sink in a liquid are collected and cleaned out of the scrap collector while in full digester and discharger operation while wood and other floating objects are harmlessly suspended in the cold blow liquid until removed during regular equipment cleaning.

It has been found that the static discharge device and method described above operate to maximum advantage with fiber consistency in the discharger of up to 6 to 8 percent. If the consistency is to exceed 8 percent, or if other conditions warrant, agitation by mechanical means may be provided while still retaining the advantages of scrap collector foreign object removal and avoidance of plugging.

Referring to FIGS. 5 and 6, there is shown an embodiment of a discharge device of another embodiment of this invention similar to that described above but having a vertical mechanical agitator 92 comprising wiping blades 102 secured by agitating cross-members 104 to the agitator shaft 96. The shaft 96 passes through a bearing packing box 94 mounted to the flange 95 and may be rotated through a coupling to a suitable drive means, not shown. The gate valve assembly, 54 and 56, and scrap collector 58 are moved to replace the blind flange 62 on the cleanout opening by means of a reducer section 106 telescopically fitted into the extension 60 and secured by a flange 108 joined to the flange 61. Another flange 110 permits mounting of the scrap collector.

The end of the shaft 96 is provided with a slightly conical plate 100 capable of catching and ejecting, into the chamber 58, any foreign objects falling or sinking down through the liquid. The conical plate 100 also provides agitation of the liquid in the discharger 42 while the blades 102 wipe the grid plate 66 to maintain it free from clogging by fiber and/or other particles such as foreign bodies. Thus, the discharge device of FIG. 5 operates substantially as previously described with the added benefit of mechanical agitation and cleaning of the face of the grid plate. Foreign objects are removed as described above without interruption of the digester operation.

Accordingly, there has been described an improved pulp discharge device and method for the discharge of fiber from a pressurized digestion system without interruption in the continuity of the operation of the digester nor loss of excessive amounts of stream or pressure within the system. This improved discharge device and method substantially reduces costly downtime due to equipment clogging and reduces the necessity of complex moving parts and the maintenance requirements thereof. In addition, the provision of means for maintaining the discharge neck grid plate wiped free from clogging permits proper circulation of liquor and enables more uniform processing of the material in the digester since variables such as temperature and the like are not upset so that proper digester balance and consequently high quality pulp are obtained.

I claim:

1. In a discharge device for discharging fibrous material from a continuous pressurized system by the cold blow method utilizing the system pressure to blow the fibrous material to a blow tank through a blow valve orifice, the improvement of a static discharger eliminating discharge device moving parts while minimizing plugging of blow valves comprising:

a. a vertical casing having connection means for connection to the pressurized system for receiving a stream of fibrous material therefrom;

b. a pair of valve means for opening and closing a cylinder forming a hollow chamber positioned therebetween;

c. the valve means and hollow chamber forming a scrap collector assembly means connected to the bottom of the casing, whereby nonbuoyant foreign bodies in the stream will sink and collect in the chamber between the valves wherefrom they may be removed by appropriate valving operations without interrupting the flow of fibrous material through the discharge conduit means;

d. a discharge conduit for connection to the blow valve means extending from the casing at a location above the scrap collector assembly means for discharge of fibrous material therefrom;

e. a grid plate covering the intersection between said discharge conduit means and said vertical casing, having openings therein to prevent passage of objects that would clog the blow valve;

f. fluid conduit means connected to said vertical casing at a location above the intersection of said discharge conduit means for introducing flooding liquid into said casing and to maintain a liquid suspension of fibrous pulp material at a predetermined level therein.

2. An improved discharge device as claimed in claim 1 wherein the fluid conduit means is a pipe positioned tangentially to the casing wall.

3. An improved discharge device as claimed in claim 1 wherein the openings in the grid plate taper toward the discharge side so that the open area facing downstream is larger than the open area facing upstream of the flow of the fibrous material.

4. An improved discharge device as claimed in claim 1 wherein the casing includes a removably sealed opening in the region between the grid plate and the scrap collector assembly means to enable cleanout access to the casing.

5. An improved discharge device as claimed in claim 1 wherein the casing is a cylindrical body having a conical transition portion terminating in means for connecting the scrap collector assembly means thereto.

6. An improved discharge device as claimed in claim 5 wherein a blind-flanged cleanout opening extends from the conical portion of the casing.

7. An improved discharge device as claimed in claim 1, additionally having adjustable means for introducing fluid into the scrap collector assembly in an amount sufficient to create an upward flow therein to prevent settling of fibrous pulp material while permitting scrap to be collected therein.

8. An improved discharge device according to claim 1, in which the discharge conduit inclines upwardly at a predetermined angle to produce a blow line substantially free of bends and to minimize pressure drops therein.

9. A discharge device for discharging fibrous material from a continuous pressurized system utilizing the system pressure to blow the fibrous material to a blow tank through a blow valve orifice comprising:

a vertical casing having connection means for connection to the pressurized system for receiving a stream of fibrous material, a scrap collection means connected to the casing, the scrap collection means including two valves positioned on the ends of a cylinder forming a hollow chamber which may be opened and closed, a discharge conduit means for connection to the blow valve means extending from the casing at a location above the scrap collection means for discharge of fibrous material therefrom.

a grid plate having openings therein covering the area of intersection of the discharge conduit and the casing to prevent passage of objects that would clog the blow valve, fluid conduit means connected to said vertical casing at a location above the intersection of said discharge conduit means for introducing flooding liquid into said casing and to maintain a liquid suspension of fibrous pulp material at a predetermined level therein, vertical agitator means for agitating the liquid within the casing positioned in the casing, the agitator means including means for wiping the grid plate and for agitating the liquid and means for catching and ejecting into the scrap collector means nonbuoyant objects sinking through the liquid in the casing.

10. An improved method for discharging fibrous material from a continuous pressurized system utilizing the system pressure to blow the fibrous material to a blow tank through a blow valve orifice comprising:

passing a stream of fibrous material from the system to a vertical casing, introducing a flooding liquid into the casing to maintain a liquid suspension of fibrous material at a predetermined level therein, passing the liquid suspension of fibrous material through an apertured grid plate and into a conduit means connected to said casing at a location above a scrap collector to screen out objects of a predetermined size, while permitting nonbuoyant foreign object impurities in the stream to sink to the scrap collector positioned beneath the casing, causing screened fibrous material to pass through the conduit means to the blow valve, said grid plate preventing passage of objects that would clog the blow valve, periodically isolating the scrap collector from the casing and removing the foreign bodies therein.

11. An improved method as claimed in claim 10 wherein the grid plate is periodically wiped clean.

12. An improved method as claimed in claim 10 wherein liquid is also introduced into the scrap collector and caused to flow upwardly therein into the casing.

* * * * *